Patented May 30, 1950

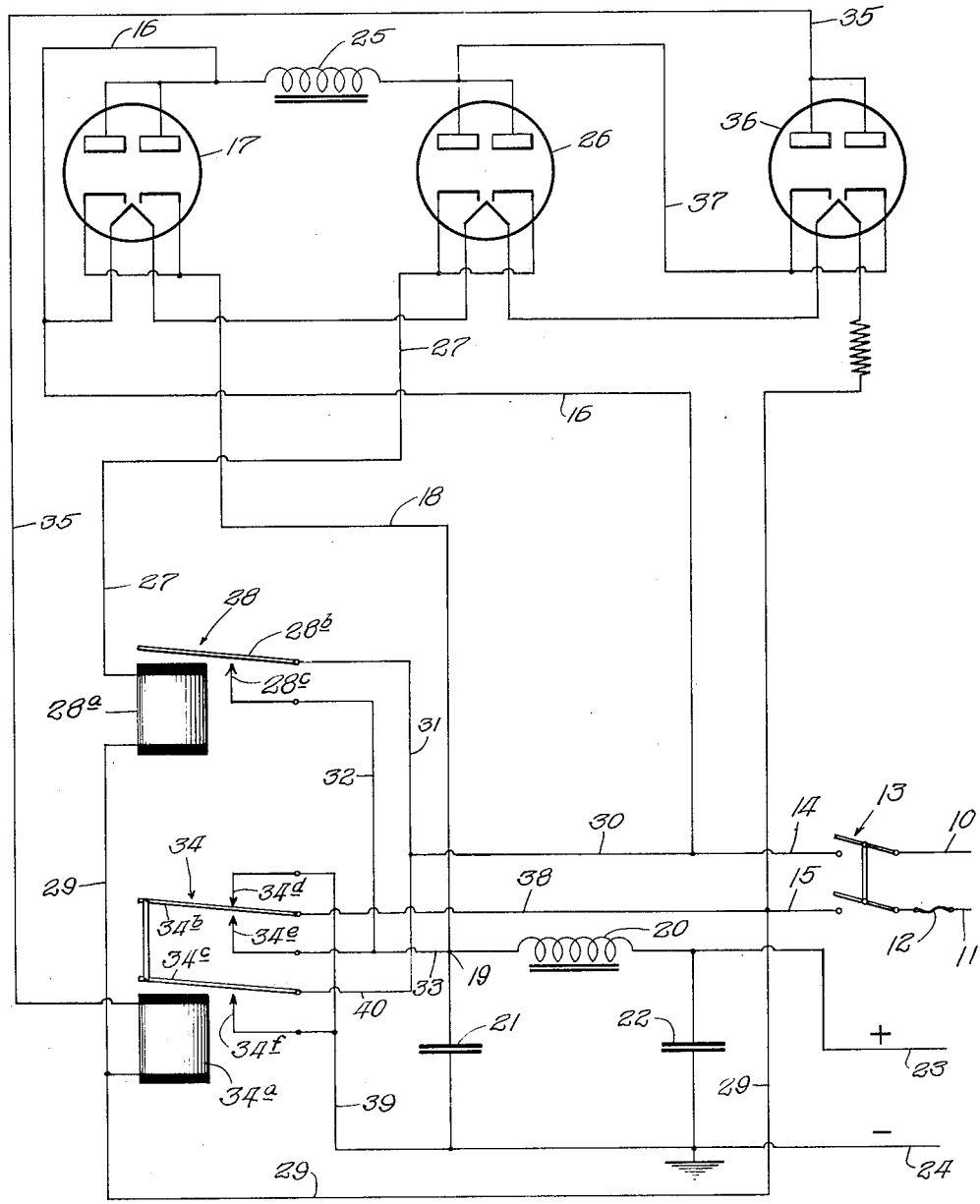

2,509,216

UNITED STATES PATENT OFFICE 2,509,216

POWER SUPPLY UNIT

Frank M. Davis, Cedar Rapids, Iowa, assignor to Collins Radio Company, a corporation of Iowa Application June 15, 1945, Serial No. 599,565

4 Claims. (Cl. 171—97)

This invention relates to a power supply unit, and more particularly to a universal power pack for providing a suitable plate supply from either an A. C. or D. C. power source.

One feature of this invention is that it provides an improved universal power supply unit or power pack for radio equipment.

Another feature of this invention is that it shorts out the rectifier when the unit is connected to a D. C. power source to avoid the voltage drop across the rectifier heretofore present during operation on D. C. This results in providing plate supply voltages, on operation from D. C. substantially equal to those available on operation from A. C. and 10% or 15% higher than heretofore possible, with attendant improvement in operation of the radio equipment.

Another feature of this invention is that the power supply unit automatically adjusts itself to the polarity of its connection to the direct current source, so that the radio equipment is immediately operative regardless of the polarity of the connection to the direct current source. This is to be contrasted with present power packs where the connection must be reversed if it is initially made with the wrong polarity.

Other features and advantages of this invention will be apparent from the following specification and the drawing, which comprises a circuit diagram of a power supply unit for a radio receiver.

There are many situations where the voltage of a source of power is known, but where such source of power is sometimes alternating current and sometimes direct current. This situation is quite general in connection with radio equipment, where the power pack or power supply unit may be designed to operate from either 110 volts A. C. or 110 volts D. C., being commonly termed the universal power supply. It has heretofore been customary to have the rectifying means or rectifier tube of the power supply operative not only on A. C., but also on D. C. This is open to several objections, however. One of the more serious objections is that the rectifier tube acts as a resistance in the plate supply circuit when the unit is connected to a direct current source resulting in a voltage drop across the rectifying tube of 10 or 15 volts with attendant lower plate voltage and reduced gain and output of the radio equipment. Another disadvantage is that when the equipment is plugged into the power supply source with the wrong polarity with respect to the D. C. potential, the unit is completely inoperative. It then becomes necessary to wait a reasonable interval to see whether the radio equipment is going to become operative and, if it does not, to reverse the polarity of the connection.

I have provided a universal power supply unit overcoming this and other objections of such units previously in use. In addition to the conventional rectifying means and filter, I incorporate in the unit means for automatically shorting out the rectifying means when the unit is connected to a direct current source, and means for automatically ensuring the proper polarity of output from the filter regardless of the polarity of the connection between the power supply unit and the source of direct current power. I accomplish this by providing a pair of relays and operating means therefor, including rectifiers and a choke, such that one relay shorts out the rectifier without disturbing the polarity of connections (where the connection between the power supply unit and the direct current source of power is initially correct), and wherein the other relay both shorts out the rectifier tube and automatically reverses the polarity (where the connection to the direct current source of power is the wrong polarity), the arrangement being such that both relays are prevented from operation during connection of the unit to an alternating current source of power.

In the particular embodiment of my invention illustrated on the accompanying drawing, the input leads or terminals 10 and 11 (which may be the two wires of a cord leading to a plug adapted to be received in a power supply source socket) are shown as connected through a fuse 12 and an on-off switch 13 to the remainder of the circuit of the power supply unit through the input wires 14 and 15. When the unit is connected to an alternating current source of power and the wire 14 is positive, current passes up through the wire 16 and between the plate and cathode elements of rectifying means here shown as a rectifier tube 17, which may be of tube type No. 25Z6, the plates and cathodes being tied together. The current flowing through the rectifying tube 17 under these conditions passes down through the wire 18 to make connection to what will here be termed the "top" terminal 19 of a filter unit comprising the choke 20, which may for example have a value of 3 henries, and a pair of condensers 21 and 22, which may have, for example, capacities of 80 and 40 microfarads, respectively. The right-hand end of the choke 20 (speaking with respect to the position of the parts as shown on the drawing) is connected to the output terminal of the power supply unit, here indicated as the wire 23, to provide positive direct current power for radio equipment, and particularly for the plates of the tubes therein. The lower connections of the condensers 21 and 22 are tied together and to ground in conventional manner to provide the negative terminal or lead of the power supply unit here identified as 24. It will be understood that, as described above, the unit operates as a conventional power pack of the half-wave type when connected to an alternating current source of power.

When the wires 10 and 11 are connected to a direct current source of power, on the other hand, the wire 10 may have a positive polarity and the wire 11 a negative, or vice versa, dependent upon how the connection is made. It will be first assumed that the polarity of the connection was such that the wire 10 was positive, and the operation of the unit described under these conditions. When the wires 10 and 14 are positive, current again flows through the wire 16, but in this case a path alternative to the rectifier 17 is provided through the choke coil 25, which blocked any appreciable current flow when the system was carrying alternating current. Under the conditions just assumed above, however, direct current flows through the choke 25 and between the elements of the rectifying tube 26, which may also be of tube type No. 25Z6 with its plates and cathodes tied together. The current flowing through the tube 26 then flows through the wire 27 and the actuating coil 28a of a relay 28 having a movable contact member 28b normally separated from a fixed contact 28c, the circuit being completed from the other end of the actuating coil 28a through the wire 29 to the other wire 11 of the input terminal or cord wires (it always being assumed that the switch 13 is closed). This energization of the relay actuating coil 28a closes the contacts 28b and 28c and provides a circuit from the wire 14 through the wires 30, 31, 32 and 33 directly to the terminal 19 of the filter section, thus shorting out the rectifying tube 17. The negative connection is completed from the wire 15 through the wire 38, the contacts 34b and 34d of the relay 34 to be more fully described hereafter, and the wire 39. While the rectifying tube 26 is operative, it is only in the relay actuating circuit and the full voltage available from the source of direct current power is applied directly to the filter terminal 19 without any loss, so that the positive output terminal 23 of the power supply unit has a voltage practically identical with the direct current voltage of the supply source.

On the other hand, if the polarity of connection of the leads 10 and 11 to the direct current source of power is such that the terminal 11 is positive and the terminal 10 negative, current flows through the wire 29, the actuating coil 34a of the relay 34, and through the wire 35 to the plates of the rectifying tube 36, which may also be of tube type No. 25Z6 with its plates and filaments tied together. The current flowing across this tube then passes through the wire 37, the choke 25 and the wire 16 back to the other power supply line 10, completing the relay actuating circuit and effecting movement of its movable elements 34b and 34c from the position shown in the drawing to an energized position where the element 34b breaks circuit with the fixed contact 34d and the elements 34b and 34c make contact respectively with the fixed contacts 34e and 34f. The wire 15 being positive in the polarity here assumed, closing of the contacts 34b and 34e completes the circuit between the positive line 11 and the positive terminal 19 of the filter, so that the output 23 is again of the correct polarity and the rectifier 17 is again shorted out; and closing of the contacts 34c and 34f completes a connection from the other power lead 10 (now negative) through the wires 30, 40 and 39 to the negative output lead 24.

It will thus be apparent that, when the power supply unit is connected to an alternating current source of power it operates in conventional manner with both of the relays in the position shown in the drawings, actuating current for the relays being blocked by the presence of the choke 25. On the other hand, if the power supply unit is connected to a direct current source of power one or the other of the relays is actuated depending upon the polarity of this connection (the rectifiers 26 and 36 being oppositely arranged). If polarity of the connection is correct with respect to the filter section of the power supply unit, the relay 28 only is actuated for the sole purpose of shorting out the tube 17. On the other hand if the polarity of the connection to the source of power is reversed, the relay 34 is actuated for the dual purpose of shorting out the tube 17 and of reversing what may be termed the normal connections to the filter section of the power supply unit.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A power supply unit adapted to be energized from either an alternating current or a direct current source of power, including: rectifying means adapted to be operative when said unit is connected to an alternating current source; and means for shorting out said rectifying means when the unit is connected to a direct current source, this means including two relays and means for effecting actuation of one relay only when one polarity of connection is made between the unit and the direct current source and for effecting actuation of the other relay only when the other polarity of connection is made between the unit and the direct current source, ensuring proper polarity of the power supply unit output regardless of the polarity of the connection between the unit and the direct current source.

2. A power supply unit adapted to be energized from either an alternating current or a direct current source of power, including: rectifying means adapted to be operative when said unit is connected to an alternating current source; and means adapted to be actuated only when said unit is connected to a direct current source and operable to short out said rectifying means when the unit is connected to a direct current source, this means including two relays and two rectifiers, each relay having an oppositely arranged rectifier in series therewith, the connections being such as to ensure proper polarity of the power supply unit output regardless of the polarity of the connection between the unit and the direct current source.

3. A power supply unit adapted to be energized from either an alternating current or a direct current source of power, including: rectifying means permanently connected in circuit and adapted to be operative when said unit is connected to an alternating current source;

means for shorting out said rectifying means when the unit is connected to a direct current source, this means including two relays and two rectifiers, each relay having an oppositely arranged rectifier in series with the actuating coil thereof, one relay being adapted merely to close a connection when actuated and the other relay being adapted to open one connection and close at least one connection when actuated, the connections being such as to ensure proper polarity of the power supply unit output regardless of the polarity of the connection between the unit and the direct current source; and means means for preventing actuation of said relays when the unit is connected to an alternating current source.

4. A power supply unit having two input terminals and two output terminals, said unit being adapted to be energized from either an alternating current or direct current source of power, including: first rectifying means connected to one of said input terminals and to one of said output terminals and adapted to be operative when said unit is connected to an alternating current source; a relay having an actuating coil and a pair of normally open contacts, one of said contacts being connected to said one input terminal and the other of said contacts being connected to the same output terminal as said rectifying means, one end of said actuating coil being connected to the other of said input terminals; second rectifying means; and a choke, the other end of said actuating coil being connected to one element of said second rectifying means and the other element of said second rectifying means being connected through said choke to said one input terminal, whereby said first rectifying means is operative when the unit is connected to an alternating current source but is shorted out when the unit is connected to a direct current source.

FRANK M. DAVIS.

REFERENCES CITED

The following references are of record in the file of this patent:

UNITED STATES PATENTS

| Number | Name | Date |
|---|---|---|
| 1,627,758 | Wallace | May 10, 1927 |
| 1,801,022 | Poncel | Apr. 14, 1931 |
| 2,043,676 | Raskhodoff | June 9, 1936 |